(12) United States Patent
McColloch

(10) Patent No.: US 9,400,360 B2
(45) Date of Patent: *Jul. 26, 2016

(54) MODIFIED TRANSISTOR OUTLINE (TO)-CAN ASSEMBLY FOR USE IN OPTICAL COMMUNICATIONS AND A METHOD

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,427

(22) Filed: Mar. 24, 2015

(65) Prior Publication Data

US 2015/0192747 A1 Jul. 9, 2015

Related U.S. Application Data

(63) Continuation of application No. 13/329,380, filed on Dec. 19, 2011, now Pat. No. 9,011,025.

(51) Int. Cl.
*H05K 7/00* (2006.01)
*G02B 6/36* (2006.01)
*G02B 6/42* (2006.01)

(52) U.S. Cl.
CPC ............ *G02B 6/4263* (2013.01); *G02B 6/4214* (2013.01); *G02B 6/4246* (2013.01); *G02B 6/4295* (2013.01); *G02B 6/4296* (2013.01)

(58) Field of Classification Search
USPC ........................................ 385/88–94; 361/820
See application file for complete search history.

(56) References Cited

U.S. PATENT DOCUMENTS

| | | | |
|---|---|---|---|
| 5,537,504 A | 7/1996 | Cina et al. | |
| 5,566,265 A * | 10/1996 | Spaeth et al. | 385/93 |
| 6,075,635 A * | 6/2000 | Butrie et al. | 398/139 |
| 6,188,495 B1 | 2/2001 | Inoue et al. | |
| 6,493,121 B1 * | 12/2002 | Althaus | 398/135 |
| 6,757,460 B2 * | 6/2004 | Melchior et al. | 385/31 |
| 6,851,870 B1 | 2/2005 | Deng et al. | |
| 7,160,039 B2 | 1/2007 | Hargis et al. | |
| 7,184,669 B2 | 2/2007 | Gordon | |
| 7,357,580 B2 | 4/2008 | Morgenstern et al. | |
| 7,413,917 B2 | 8/2008 | Gallup et al. | |
| 7,785,020 B2 | 8/2010 | Kim et al. | |
| 7,785,930 B2 | 8/2010 | Johnson | |
| 9,011,025 B2 * | 4/2015 | McColloch | G02B 6/4246 361/820 |
| 2002/0028049 A1 | 3/2002 | Bartur et al. | |

\* cited by examiner

*Primary Examiner* — Daniel Petkovsek

(57) ABSTRACT

A modified TO-can assembly is provided that has greater versatility with respect to spatial constraints than known TO-can assemblies and that is suitable for use in a wider range of applications than known TO-can assemblies. The modified TO-can assembly has a receptacle that has been modified to receive an optical fiber through its side instead of through its end. Within the TO-can assembly, the optical path is folded in order to couple the light between the optoelectronic component of the TOSA or ROSA and the end of the optical fiber. The combination of these features provides the modified TO-can assembly with a compact profile that makes it more versatile with respect to spatial constraints and therefore suitable for use in a wider range of applications.

20 Claims, 7 Drawing Sheets

US 9,400,360 B2

MODIFIED TRANSISTOR OUTLINE (TO)-CAN ASSEMBLY FOR USE IN OPTICAL COMMUNICATIONS AND A METHOD

CROSS-REFERENCE TO RELATED APPLICATIONS

This application is a continuation application of application Ser. No. 13/329,380, filed on Dec. 19, 2011, entitled "A MODIFIED TRANSISTOR OUTLINE (TO)-CAN ASSEMBLY FOR USE IN OPTICAL COMMUNICATIONS AND A METHOD," which has been allowed and which is hereby incorporated by reference herein in its entirety.

TECHNICAL FIELD OF THE INVENTION

The invention relates to transistor outline (TO)-can assemblies. More particularly, the invention relates to a modified TO-can assembly for use in optical communications.

BACKGROUND OF THE INVENTION

A variety of optical communications modules are used in optical networks for transmitting and receiving optical data signals over the networks. An optical communications module may be an optical receiver module that has optical receiving capability, but not optical transmitting capability. Alternatively, an optical communications module may be an optical transmitter module that has optical transmitting capability, but not optical receiving capability. Alternatively, an optical communications module may be an optical transceiver module that has both optical transmitting and optical receiving capability.

A typical optical transmitter or transceiver module has a transmitter optical subassembly (TOSA) that includes a laser driver circuit, at least one laser diode and various other electrical components. The laser driver circuit outputs an electrical drive signal to each respective laser diode to cause the respective laser diode to be modulated. When the laser diode is modulated, it outputs optical signals that have power levels corresponding to logic 1s and logic 0s. An optics system of the module focuses the optical signals produced by each respective laser diode into the end of a respective transmit optical fiber held within an optical connector module that connects to the optical transmitter or transceiver module.

A typical optical receiver or transceiver module has a receiver optical subassembly (ROSA) that includes at least one receive photodiode and various other electrical components. An optics system of the ROSA focuses an optical data signal that is output from the end of an optical fiber onto a photodiode of the ROSA. The photodiode converts the incoming optical data signal into an electrical analog signal. An electrical detection circuit, such as a transimpedance amplifier (TIA), receives the electrical signal produced by the photodiode and outputs a corresponding amplified electrical signal, which is processed by other circuitry of the ROSA to recover the data.

One well known type of optical communications module is a TO-can assembly. FIG. 1 illustrates a perspective view of one known TO-can assembly 2 having a typical TO-can assembly configuration. The TO-can assembly 2 includes a header 3, a ring 4, a cap 5, a collar 6, and a receptacle 7. The header 3, the ring 4, the cap 5, the collar 6, and the receptacle 7 are typically made of a metal material, such as stainless steel, for example, to allow them to be welded together. The TO-can assembly 2 is generally cylindrical in shape. The header 3 has an upper mounting surface 3a on which a TOSA and/or a ROSA and other electric components are mounted. These components are internal to the ring 4 and therefore are not visible in FIG. 1. Electrical leads (not shown) or electrical contacts (not shown) are disposed on a lower surface 3b of the header 3 for electrically interconnecting the TOSA or ROSA of the assembly 2 to external electrical circuitry, such as electrical circuitry of a printed circuit board (PCB) (not shown). A portion of a flexible (flex) circuit is sometimes mounted on the header 3, in which case the electrical and optoelectronic components of the TO-can assembly are mounted on the flex circuit and electrically connected thereto.

The ring 4 has a first end 4a and a second end 4b. The second end 4b of the ring 4 is fixedly secured to the upper surface 3a of the header 3. The cap 5 has a first end 5a and a second end 5b. The second end 5b of the cap 5 is fixedly secured to the first end 4a of the ring 4. The collar 6 has a first end 6a and a second end 6b. The second end 6b of the collar 6 is fixedly secured to the first end 5a of the cap 5. The receptacle 7 has a first end 7a and a second end 7b. The second end 7b of the receptacle 7 is seated within and fixedly secured to the first end 6a of the collar 6. The receptacle 7 is a tube-like structure that receives a portion of an optical fiber (not shown) that is passed through the first end 7a of the receptacle 7 and secured therein. The optoelectronic component (not shown) mounted on the upper surface 3a of the header 3 may be either an optoelectronic light source, such as a laser, or an optoelectronic light sensor, such as a photodiode, depending on whether the TO-can assembly 2 contains a TOSA or a ROSA, respectively.

The optical axis of the TO-can assembly 2 is represented by dashed line 8. If the TO-can assembly 2 contains a TOSA, light emitted by the laser diode (not shown) of the TOSA propagates along the optical axis 8 into the end of the optical fiber (not shown). If the TO-can assembly 2 contains a ROSA, light passing out of the end of the optical fiber propagates along the optical axis 8 and is received by the photodiode of the ROSA.

Prior to fixedly securing the collar 6 to the cap 5 and securing the receptacle 7 to the collar 6, the position of the collar 6 in an X-Y plane of an X, Y, Z Cartesian Coordinate system is adjusted to optically align the end of the optical fiber secured within the receptacle 7 with the laser diode or photodiode of the TOSA or ROSA, respectively. Once optical alignment in the X-Y plane has been achieved, the position of the receptacle 7 along the Z-axis, which corresponds to the optical axis 8, is adjusted to achieve the desired focus. For example, in the case of a TOSA, the position of the receptacle 7 along the Z-axis is adjusted until the optical beam emitted by the laser diode is brought to a focal point on the end of the optical fiber. In the case of a ROSA, the position of the receptacle 7 along the Z-axis is adjusted until the optical beam passing out of the end of the optical fiber is brought to a focal point on the light-receiving portion of the photodiode. Once the proper Z-axis alignment has been achieved, the second end 7b of the receptacle 7 is fixedly secured to the first end 6a of the collar 6.

A laser welding process is typically used to fixedly secure the receptacle 7 to the collar 6 and to fixedly secure the collar 6 to the cap 5. A projection welding process is typically used to fixedly secure the cap 5 to the ring 4. Projection welding typically forms a hermetic seal, whereas laser welding typically does not form a hermetical seal. Because a hermetical seal is needed between the cap 5 and the ring 4, projection welding is typically used for this purpose.

It can be seen in FIG. 1, that the receptacle 7 of the TO-can assembly 2 has a relatively long length, L, in the Z-dimension. The length, L, is about 0.75 inches. Because of the relatively long length, L, of the receptacle 7, the TO-can assembly 2 is not suitable for use in many modules due to spatial constraints. Consequently, TO-can assemblies of the type shown in FIG. 1 are limited to use in modules that are capable of accommodating the long lengths of their receptacles. It would be desirable to provide a TO-can assembly that has greater versatility with respect to spatial constraints so that it may be used in a wider range of applications and environments.

SUMMARY OF THE INVENTION

The invention is directed to a modified TO-can assembly having a top surface, a bottom surface, and a side wall. The top and bottom surfaces are generally parallel to an X-Y plane of an X, Y, Z Cartesian coordinate system defined by an X-axis, a Y-axis and a Z-axis. The modified TO-can assembly has a central axis that is generally coaxial with the Z-axis. The modified TO-can assembly has an opening formed in the side wall thereof for receiving a portion of an optical fiber in the modified TO-can assembly at a non-zero degree angle, a, relative to the Z-axis.

In accordance with an embodiment, the modified TO-can assembly comprises a header, an optical subassembly (OSA), a cap, a window, a collar, and a receptacle. The OSA is disposed on an upper surface of the header and includes at least an optoelectronic device. A portion of the lower surface of the cap is mechanically coupled to a portion of the upper surface of the header in such a way that a hermetical seal is formed between these surfaces. The upper surface of the window is mechanically coupled to the inner surface of the cap about a peripheral portion of the window. The window is transparent to an operational wavelength of the optoelectronic device. A portion of the lower surface of the collar is mechanically coupled to a portion of the upper surface of the cap. The receptacle has at least a top surface, a bottom surface and an outer wall. A portion of the outer wall of the receptacle is mechanically coupled to a portion of the inner surface of the collar. The bottom surface of the receptacle has a groove formed in it that has a length-wise axis. The groove is adapted to receive a portion of an optical fiber that is passed though an opening formed in the outer wall of the receptacle. The portion of the optical fiber received in the groove has an optical axis that is parallel to the length-wise axis of the groove. The length-wise axis of the groove is at a non-zero degree angle, a, to a Z-axis of a Cartesian coordinate system defined by an X-axis, a Y-axis and a Z-axis. Therefore, the optical axis of the portion of the optical fiber is also at the angle, a, relative to the Z-axis of the optical fiber. The top and bottom surfaces of the receptacle are generally parallel to an X-Y plane defined by the X and Y axes.

These and other features and advantages of the invention will become apparent from the following description, drawings and claims.

DETAILED DESCRIPTION OF AN ILLUSTRATIVE EMBODIMENT

Figure 1:
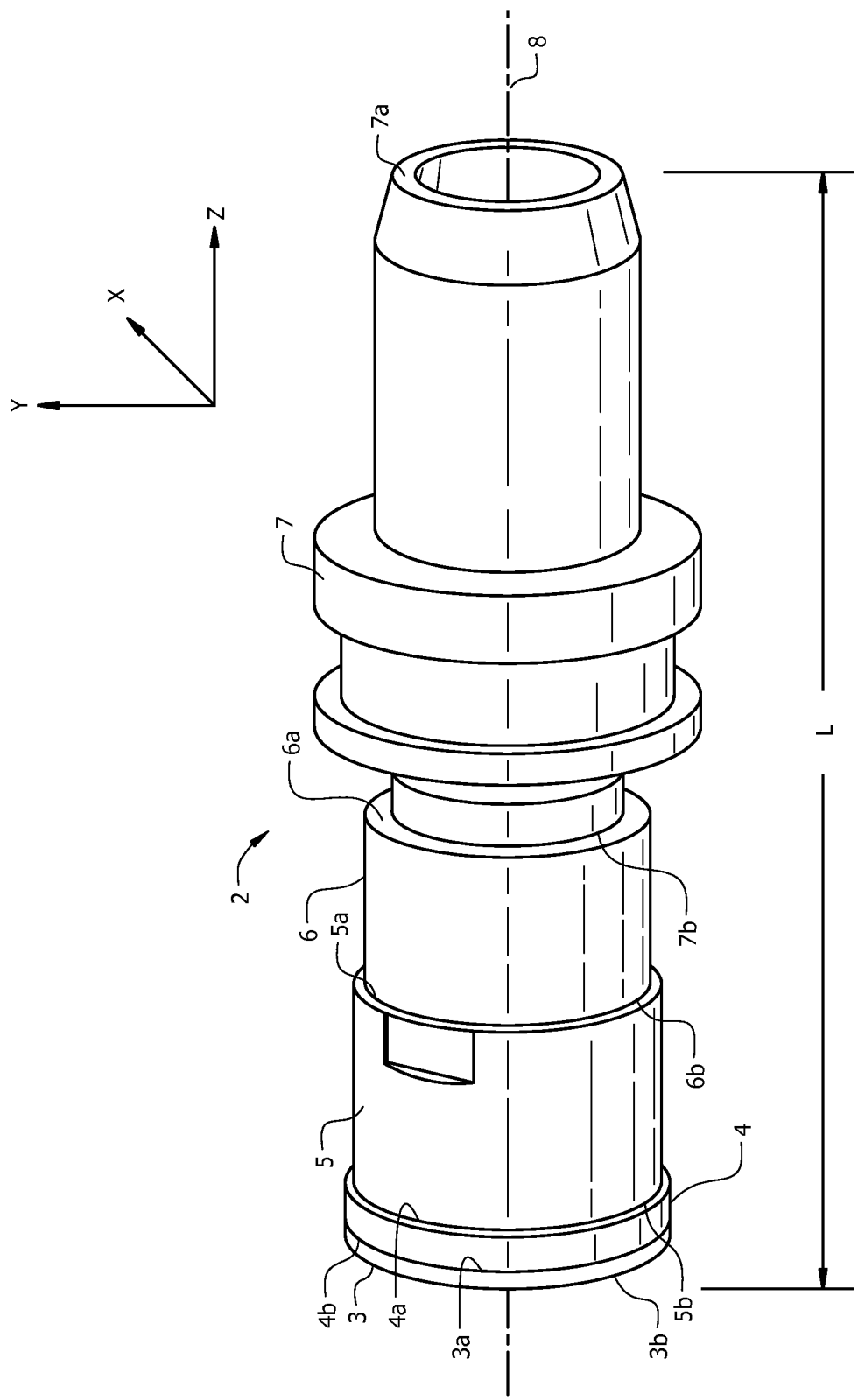
FIG. 1 illustrates a perspective view of a known TO-can assembly that is commonly used in the optical communications industry.

In accordance with embodiments of the invention, a modified TO-can assembly is provided that has greater versatility with respect to spatial constraints and that is suitable for use in a wide range of applications and environments. The modified TO-can assembly has a receptacle that has been modified to receive an optical fiber through its side instead of through its end. Within the TO-can assembly, the optical path is folded in order to couple the light between the optoelectronic component of the TOSA or ROSA and the end of the optical fiber. The combination of these features provides the TO-can assembly with a compact profile that makes it more versatile with respect to spatial constraints and therefore suitable for use in a wider range of applications and environments. Illustrative, or exemplary, embodiments will now be described with reference to FIGS. 2-7. Like reference numerals in the figures represent like elements or components.

Figure 2:
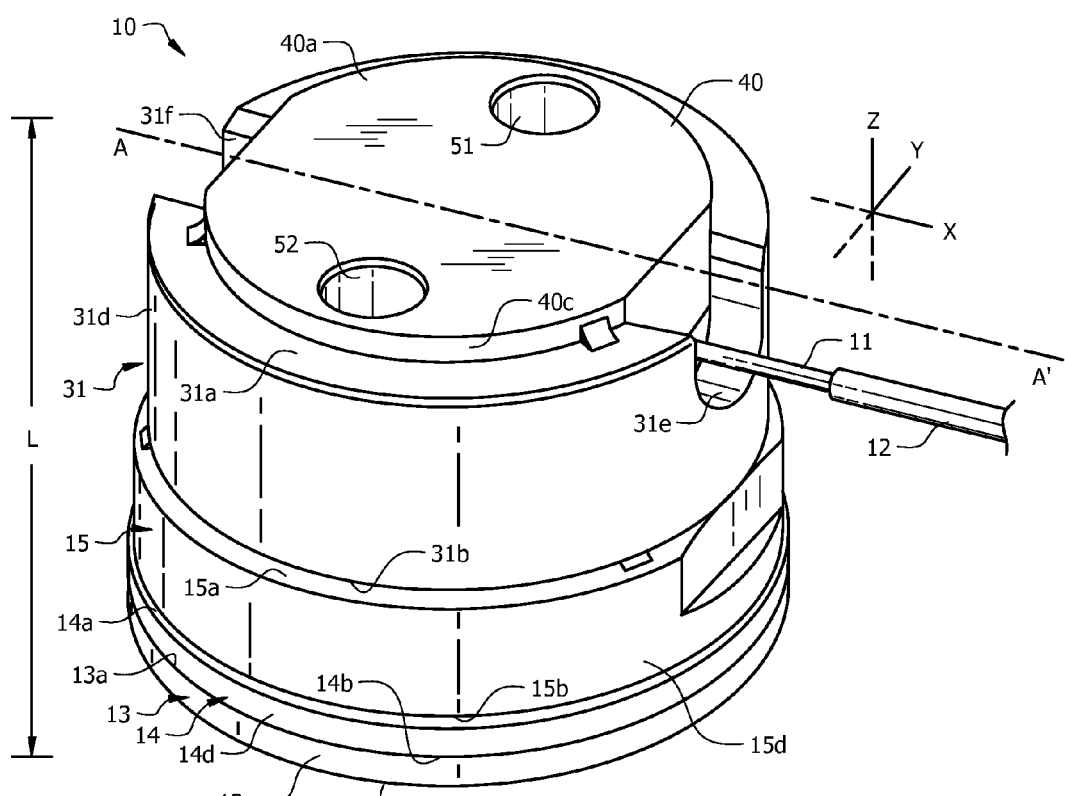
FIG. 2 illustrates a perspective view of the modified TO-can assembly in accordance with an illustrative embodiment of the invention.
Figure 3:
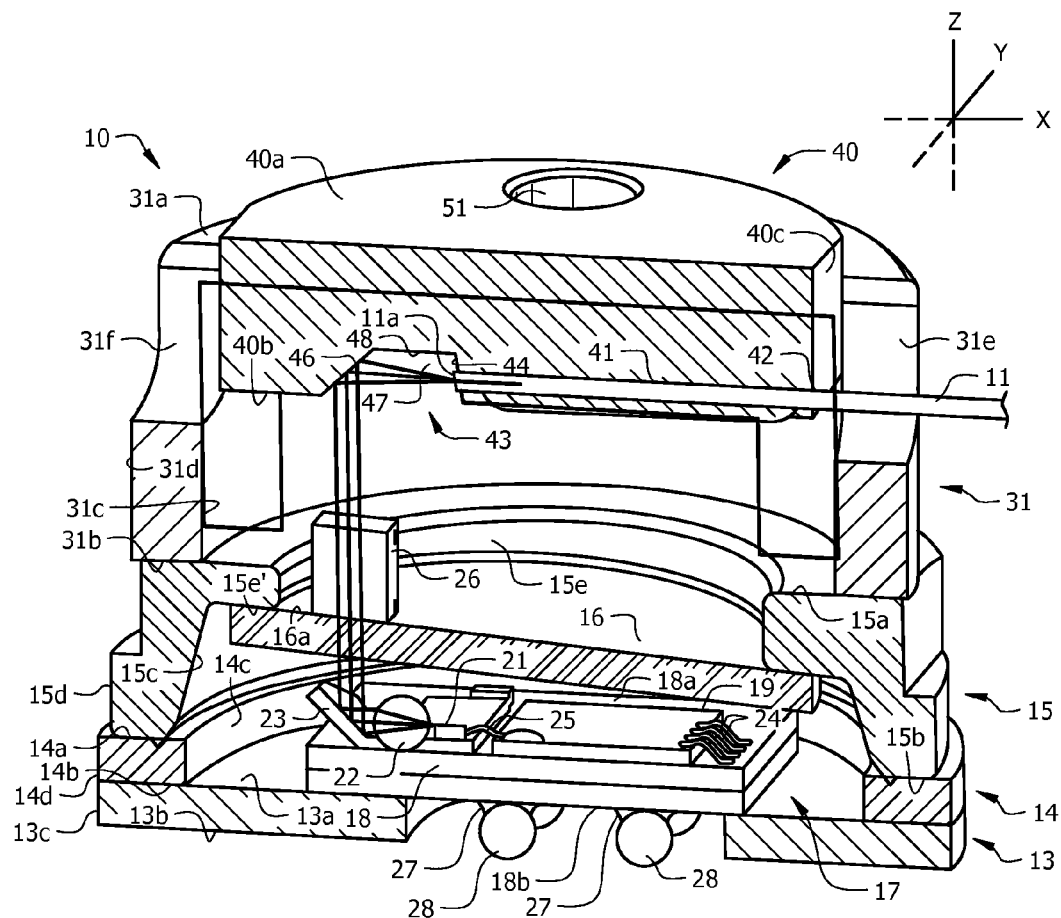
FIG. 3 illustrates a cross-sectional view of a portion of the TO-can assembly shown in FIG. 2 taken along line A-A'.
Figure 4:
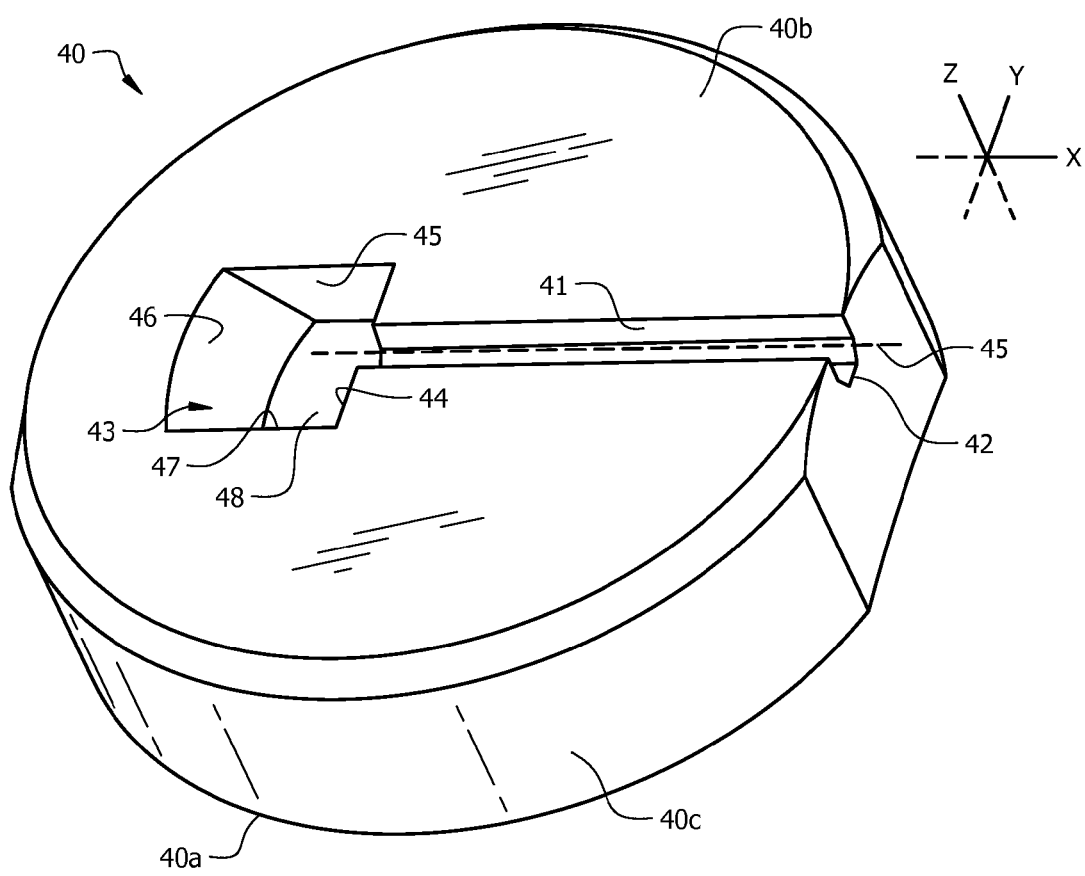
FIG. 4 illustrates a bottom perspective view of a modified receptacle of the TO-can assembly shown in FIGS. 2 and 3.

FIG. 2 illustrates a perspective view of the modified TO-can assembly 10 in accordance with an illustrative embodiment. FIG. 3 illustrates a cross-sectional view of a portion of the TO-can assembly 10 shown in FIG. 2 taken along line A-A'. FIG. 4 illustrates a bottom perspective view of a modified receptacle 40 of the TO-can assembly 10 shown in FIGS. 2 and 3. In FIGS. 2 and 3, the TO-can assembly 10 is shown connected to an end of an optical fiber 11 of an optical fiber cable 12. A portion of the optical fiber 11 passes through the side of the assembly 10 and is disposed in the interior of the assembly 10. The portion of the optical fiber 11 that is disposed in the interior of the assembly 10 has an optical axis that is at a non-zero degree angle, a, to the Z-axis of an X, Y, Z Cartesian coordinate system defined by the X-axis, Y-axis and Z-axis shown in FIGS. 2-4.

A header 13 is provided that has an upper surface 13a, a lower surface 13b, and a side wall 13c. The upper surface 13a of the header 13 functions as a mounting surface for mounting the components of the ROSA or TOSA of the modified TO-can assembly 10, as will be described below in more detail. A ring 14 of the assembly 10 is generally cylindrical in shape and has an upper surface 14a, a lower surface 14b, an inner surface 14c, and an outer surface 14d. The inner and outer surfaces 14c and 14d of the ring 14 define a side wall of the ring 14. The lower surface 14b of the ring 14 is secured to the upper surface 13a of the header 13.

A cap 15 of the assembly 10 is generally cylindrical in shape and has an upper surface 15a, a lower surface 15b, an inner surface 15c, and an outer surface 15d. The inner and outer surfaces 15c and 15d of the cap 15 define a side wall of the cap 15. An inner rim 15e extends inwardly towards the center of the cap 15 from its upper and inner surfaces 15a and 15c, respectively. The rim 15e has a thickness that varies in the Z-dimension as a function of the X and Y coordinates of positions on the rim 15e. This variation in thickness results in a variation in the Z-dimension between a lower surface 15e' of the rim 15e and the upper surface 13a of the header 13 as a function of the X and Y coordinates. A window 16 made of a transparent material such as glass, for example, has an upper surface 16a that is secured to the lower surface 15e' of the rim 15e about a peripheral portion of the window 16. The variation in the thickness of the rim 15e causes the window 16 to be tilted relative to the upper surface 13a of the header 13. The lower surface 15b of the cap 15 is secured to the upper surface 14a of the ring 14.

The combination of the upper surface 13a of the header 13, the inner surface 14c of the ring 14, the inner surface 15c of the cap 15, and the transparent window 16 provides a hermetically-sealed compartment 17 within the assembly 10. Within this hermetically-sealed compartment 17, the following components are located: a hermetically-sealing substrate 18, which is mounted on the upper surface 13a of the header 13; an integrated circuit (IC) chip 19, which is mounted on an upper surface 18a of the substrate 18; an optoelectronic component 21, which is mounted on the upper surface 18a of the substrate 18; a ball lens 22, which is mounted on the upper surface 18a of the substrate 18; a reflector 23, which is mounted on the upper surface 18a of the substrate 18; bond wires 24 interconnecting the substrate 18 and the IC chip 19; and bond wires 25 interconnecting the IC chip 19 and the optoelectronic component 21. The bottom surface 18b of the substrate 18 has electrical contacts 27 thereon that are connected to solder balls 28, which may subsequently be used to electrically interconnect the substrate 18 with a circuit board (not shown) that is external to the modified TO-can assembly 10. The substrate 18 typically is made of a ceramic material, such as aluminum oxide (AlO), for example, due to the hermetically-sealing qualities of such ceramics.

The substrate 18 and the components 19, 21, 22, 23, 24, and 25 are part of either a TOSA or a ROSA, depending on whether the TO-can assembly 10 is configured as an optical transmitter or as an optical receiver. If the TO-can assembly 10 is configured as an optical transmitter, then the substrate 18 and the components 19, 21, 22, 23, 24, and 25 are part of a TOSA, in which case the optoelectronic component 21 is a laser diode and the IC chip 19 is a laser diode driver IC for driving the laser diode. If the TO-can assembly 10 is configured as an optical receiver, then the substrate 18 and the components 19, 21, 22, 23, 24, and 25 are part of a ROSA, in which case the optoelectronic component 21 is a photodiode and the IC chip 19 is a receiver IC for receiving and processing electrical signals produced by the photodiode. The hermetically-sealed compartment 17 provides an airtight environment that protects the components of the TOSA or ROSA from moisture, gasses and other airborne matter.

A collar 31 of the assembly 10 is generally cylindrical in shape and has an upper surface 31a, a lower surface 31b, an inner surface 31c, and an outer surface 31d. The inner and outer surfaces 31c and 31d of the collar 31 define a side wall of the collar 31. The lower surface 31b of the collar 31 is secured to the upper surface 15a of the cap 15. The collar 31 has U-shaped openings 31e and 31f formed on opposite sides of the collar 31 that extend through its upper, inner and outer surfaces 31a, 31c and 31d, respectively.

The receptacle 40 of the assembly 10 is disposed within the collar 31 and is secured to portions of the inner surface 31c of the collar 31. The receptacle 40 has a top surface 40a, a bottom surface 40b, and an outer wall 40c. A groove 41 formed in the bottom surface 40b of the receptacle 40 is shaped and sized to receive a portion of the optical fiber 11, which is secured to the groove 41. The groove 41 extends between an opening 42 formed in the outer wall 40c of the receptacle 40 and a recess 43 formed in the bottom surface 40b of the receptacle 40, as can be more clearly seen in the bottom perspective view of the receptacle 40 shown in FIG. 4. The recess 43 is defined by first, second, third, fourth, and fifth walls 44, 45, 46, 47, and 48, respectively. The third wall 46 is a reflector that is used to fold the optical pathway, as will be described below in more detail. The reflector 46 faces the end 11a of the optical fiber 11.

As can be seen in FIGS. 2 and 3, the optical fiber 11 enters and exits the outer wall 40c of the receptacle 40 at the aforementioned non-zero degree angle, a, to the Z-axis. The Z-axis is generally normal to the surfaces 13a, 13b, 14a, 14b, 15a, 15b, 31a, 31b, 40a, and 40b. Thus, the Z-axis is a central axis of the modified TO-can assembly 10. The X- and Y-axes are generally parallel to the surfaces 13a, 13b, 14a, 14b, 15a, 15b, 31a, 31b, 40a, and 40b. The groove 41 has a length-wise axis 45 that is at the same non-zero degree angle, a, relative to the Z-axis as the optical axis of the portion of the optical fiber 11 disposed in the groove 41. In an embodiment, the non-zero degree angle, a, ranges from about 70° to 110° relative to the Z-axis, and is typically about 90° relative to the Z-axis. In the illustrative embodiment shown in FIGS. 2 and 3, the non-zero degree angle, a, is 90° relative to the Z-axis. Thus, in accordance with the illustrative embodiment, the optical axis of the portion of the optical fiber 11 that is disposed within the groove 41 is at a right angle relative to the Z-axis and relative to the central axis of the assembly 10. The optical axis of the portion of the optical fiber 11 that is disposed in the groove 41 is parallel to, and in some cases coaxial with, the length-wise axis 45 of the groove 41.

Because the optical fiber 11 enters and exits the modified TO-can assembly 10 through the outer wall 40c of the receptacle 40 at a non-zero degree angle relative to the Z-axis rather than parallel to the Z-axis, as in the known TO-can assembly 2 shown in FIG. 1, the modified TO-can assembly 10 has a length, L, in the Z dimension that is significantly shorter than the length, L, of the known TO-can assembly 2 shown in FIG. 1 in the Z dimension. The length, L, of the modified TO-can assembly 10 ranges from about 0.12 to about 0.2 inches. Thus, the length, L, of the modified TO-can assembly 10 is more than 50% shorter than the length, L, of the known TO-can assembly 2. This shorter length of the modified TO-can assembly 10 gives it a very compact profile that makes it more versatile with respect to spatial constraints of modules and therefore more suitable for use in a wider range of applications than the known TO-can assembly 2 shown in FIG. 1.

Because of these modifications, however, the optical pathway is folded within the modified TO-can assembly 10, as will now be described with reference to FIG. 3. Assuming for exemplary purposes that the modified TO-can assembly 10 is configured to operate as an optical transmitter, the laser diode driver IC 19 drives the laser diode 21 with electrical signals to cause the laser diode 21 to emit an optical signal. The optical signal is collimated by the ball lens 22 into a collimated light beam, which is then reflected by the reflector 23 toward the window 16, which is transparent to the wavelength of the collimated light beam. The aforementioned tilt of the window 16 helps prevent a portion of the collimated light beam from being reflected back into the aperture of the laser diode 21. It is known to use tilted windows in TO-can assemblies to provide hermetical seals while also preventing back reflection onto the laser diode or photodiode.

An optical isolator 26, which is also a known device that is sometimes used in known TO-can assemblies, may be used to help prevent back reflection. The optical isolator 26 is typically needed in cases where the optical link is relatively long (e.g., greater than or equal to 10 kilometers), but typically is not needed in cases where the optical link is relatively short (e.g., less than 10 kilometers).

The collimated light beam passes through the isolator 26 and is incident on the reflector 46. The reflector 46 reflects the collimated light beam by the angle, a, relative to the Z-axis and focuses the reflected light beam into the end 11a of the optical fiber 11. As indicated above, in accordance with the illustrative embodiment, α is equal to 90°. Therefore, in accordance with the illustrative embodiment, the optical pathway is folded inside of the modified receptacle 40 by an approximate angle of 90° relative to the Z-axis. If a was, for example, 70°, then the reflector 46 would fold the optical pathway inside of the modified receptacle 40 by an angle of 70°. The light beam then propagates along the optical fiber 11 out of the modified TO-can assembly 10.

If the modified TO-can assembly 10 is configured to operate as an optical receiver, a light beam passing out of the end 11a of the optical fiber 11 is incident on the reflector 46, which reflects the light beam by the angle α such that the reflected light beam is directed in a direction that is parallel to the Z-axis through the isolator 26 and through the window 16 onto the reflector 23. The reflector 23 then directs the light beam onto the ball lens 22, which then focuses the light beam onto the photodiode 21. The photodiode 21 converts the light beam into an electrical signal, which is then delivered to the receiver IC 19 via the leads 25 for further processing by the receiver IC 19.

Figure 5:
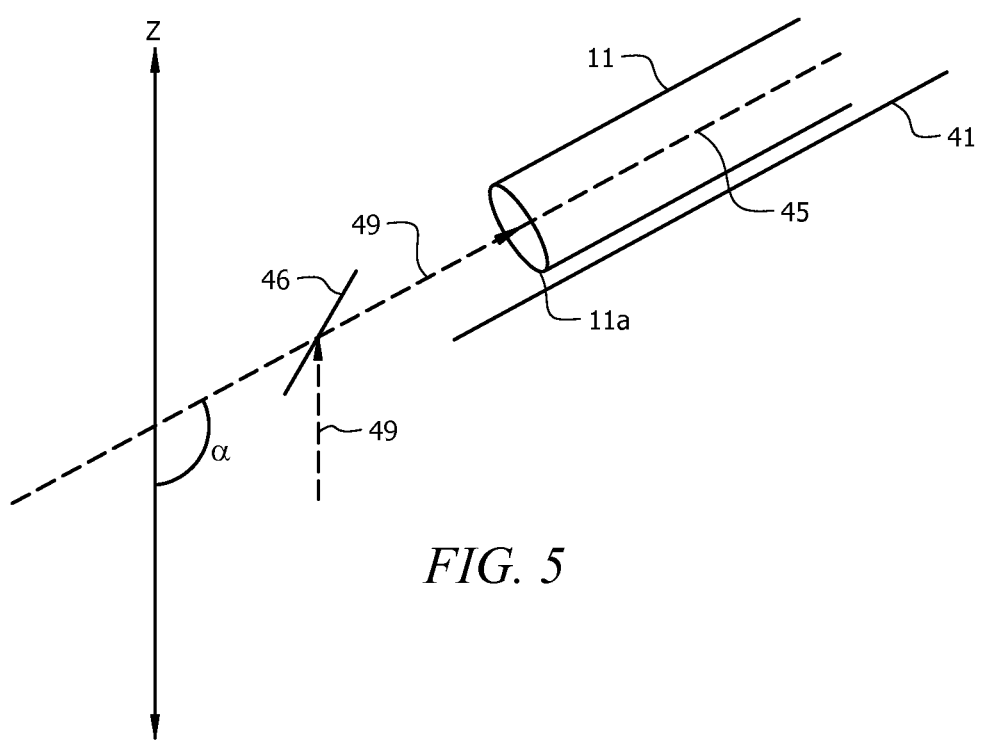
FIG. 5 illustrates a side plan view of the portion of the optical fiber that is disposed in the modified TO-can assembly shown in FIGS. 2 and 3 and demonstrates the manner in which the reflector folds the optical pathway of the modified TO-can assembly.

FIG. 5 is side plan view of the portion of the optical fiber 11 that is disposed in the groove 41 and demonstrates the manner in which the reflector 46 folds the optical pathway of the modified TO-can assembly 10 shown in FIGS. 2 and 3. Because the reflector 46 folds the optical pathway in the same manner in the transmit and receive directions, only the transmit direction will be described for exemplary purposes. A light beam 49 produced by the laser diode (not shown) of the OSA (not shown) is incident on the reflector 46. The portion of the optical pathway that extends in between the OSA and the reflector 46 is typically parallel to the Z-axis. In accordance with this example, the length-wise axis 45 of the groove 41 is at an angle of 110° relative to the Z-axis, i.e., α=110°. As indicated above, a is typically equal to 90°, but that is not necessarily the case. The reflector 46 reflects the light beam 49 by the angle α, which is 110° in this example, such that the reflected light beam is directed into the end 11a of the optical fiber 11.

With reference again to FIG. 3, prior to securing the collar 31 to the cap 15, the collar 31 is moved in the X-Y plane along the upper surface 15a of the cap 15 until optical alignment in the X-Y plane has been achieved. Once optical alignment in the X-Y plane has been achieved, the lower surface 31b of the collar 31 is fixedly secured to the upper surface 15a of the cap 15. Prior to securing the receptacle 40 to the collar 31, the receptacle 40 is moved along the Z-axis within the collar 31 to ensure that the focal point of the reflector 46 is centered on the end 11a of the optical fiber 11. Once the proper focus has been achieved, the outer wall 40c of the receptacle 40 is fixedly secured to the inner surface 31c of the collar 31.

While the invention is not limited with respect to the materials of which the header 13, the ring 14, the cap 15, the collar 31, and the receptacle 40 are made, these components are typically made of stainless steel. Other materials, such as a variety of metals and even hard plastics, may also be used for this purpose. Making these parts of metal materials such as stainless steel allows the respective surfaces to be joined together using known welding techniques, such as the projection welding process that is used to join together the respective surfaces of the header 3, the ring 4, and the cap 5, and the laser welding process that is used to join together the respective surfaces of the cap and the collar 6 and the collar 6 and the receptacle 7 of the known TO-can assembly 2 shown in FIG. 1. Two holes 51 and 52 are formed in the top surface 40a of the receptacle 40 to allow a person performing the optical alignment and welding processes to hold, move and release the receptacle 40 at proper times and locations during the alignment and welding processes.

Frit bonding, which is also a well known technique for joining parts, will typically be used to attach the upper surface 16a of the window 16 to the lower surface 15e' of the inner rim 15e. Frit bonding is typically also used to attach the optical fiber 11 to the groove 41. While other bonding techniques are also suitable for this purpose, frit bonding is well suited for creating a strong bond between glass and steel. Because the window 16 and the optical fiber 11 are typically made of glass and the cap 15 and the receptacle 40 are typically made of stainless steel, frit bonding is well suited for creating these bonds.

The optical fiber 11 is cleaved to form the end 11a, typically by using a high-precision laser cleaving process. The receptacle 40 is typically stamped to form the recess 43 in the bottom surface 40b of the receptacle 40. The wall that forms the reflector 46 may be gold plated to prevent it from becoming oxidized. The reflector 46 may be flat, in which case it has no optical power, or it may be curved in a predetermined manner such that it provides a preselected amount of optical power.

It should be noted that many changes may be made to the modified TO-can assembly 10 shown in FIGS. 2-4 within the scope of the invention. For example, the substrate 18 and the IC 19 could be located outside of the assembly 10, in which case electrical leads (not shown) would pass through the header 13 for electrically interconnecting the optoelectronic device 21 with the electrical contacts of an external circuit board (not shown) or substrate. Also, the optoelectronic device 21 could be mounted on a mounting structure (not shown) in the assembly 10 with an orientation that obviates the need for the reflector 23. The reflector 23 is needed in the illustrative embodiment to fold the optical pathway due to the components of the TOSA or ROSA being mounted on the substrate 18 within the assembly 10. Because of this illustrative mounting arrangement, the optical pathway is folded once in addition to the folding performed by the reflector 46. By orienting the optoelectronic device 21 such that it is optically aligned in the X, Y and Z dimensions with the reflector 46, the need for the reflector 23 would be eliminated.

Figure 6:
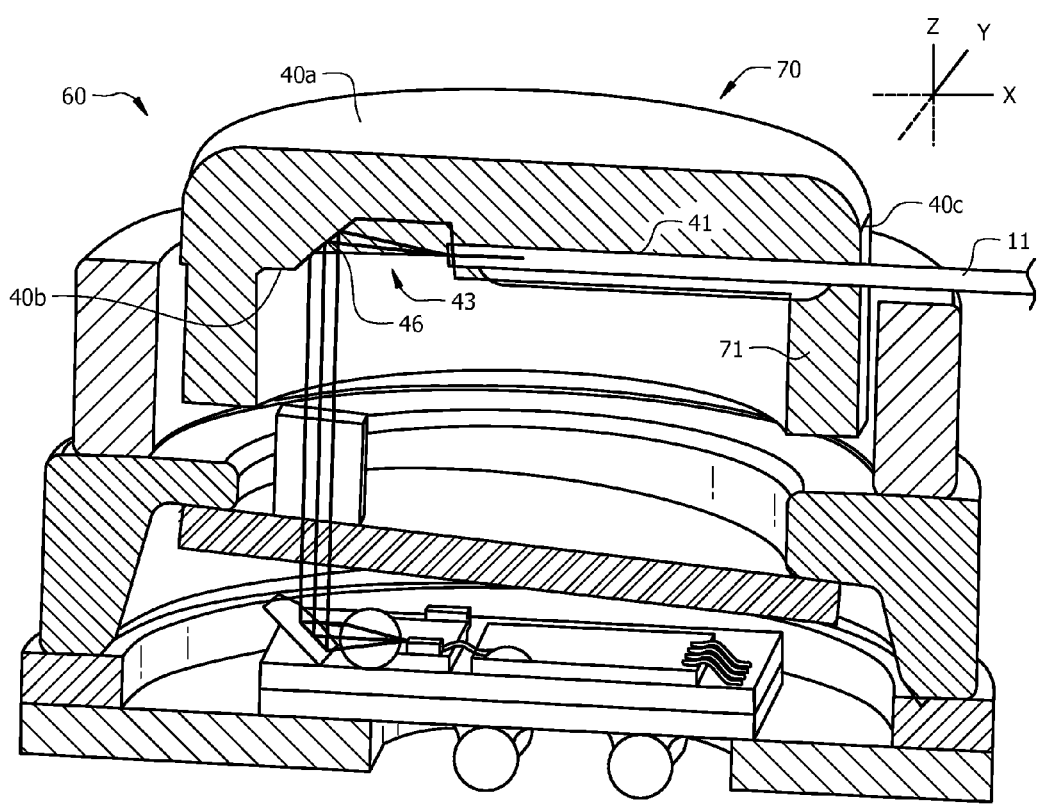
FIG. 6 illustrates a cross sectional view of the modified TO-can assembly in accordance with another illustrative embodiment having a modified receptacle that is different from the modified receptacle shown in FIG. 4.

The receptacle 40 may also have a variety of configurations. For example, FIG. 6 illustrates a cross sectional view of the modified TO-can assembly 60 in accordance with another illustrative embodiment having a modified receptacle 70 that is different from the modified receptacle 40 shown in FIGS. 2-4. The receptacle 40 shown in FIGS. 2-4 is generally shaped like a plate. The receptacle 70 shown in FIG. 6 is similar in structure to the receptacle 40 except that the receptacle 70 has a flange 71. The flange 71 provides additional outer surface area on the receptacle 70 for Z-dimension adjustment during the alignment and welding operations.

It can be seen from the different configurations of the receptacles 40 and 70 that the goals of the invention can be achieved using a variety of receptacle configurations. Virtually any receptacle configuration that brings the optical fiber into the TO-can assembly from the side rather than the top and that folds the optical pathway by an angle that is sufficient to couple optical signals between the end of the optical fiber and the TOSA or ROSA of the TO-can assembly is suitable for use with the invention.

For example, while the groove 41 is a suitable mechanism for affixing the optical fiber 11 to the receptacle 40 or 70 and ensuring that the optical fiber 11 is in alignment with the reflector 46 of the recess 43, there are many other ways of accomplishing this task. For example, the groove 41 could be eliminated and the fiber 11 could be affixed to the bottom surface 40b of the receptacle 70. In the latter case, the recess 43 could also be eliminated and a reflector (not shown) could be secured to, or integrally formed on, the bottom surface 40b such that the reflector and the end 11a of the fiber 11 are optically aligned to achieve the same objectives described above with reference to FIGS. 2-4.

Figure 7:
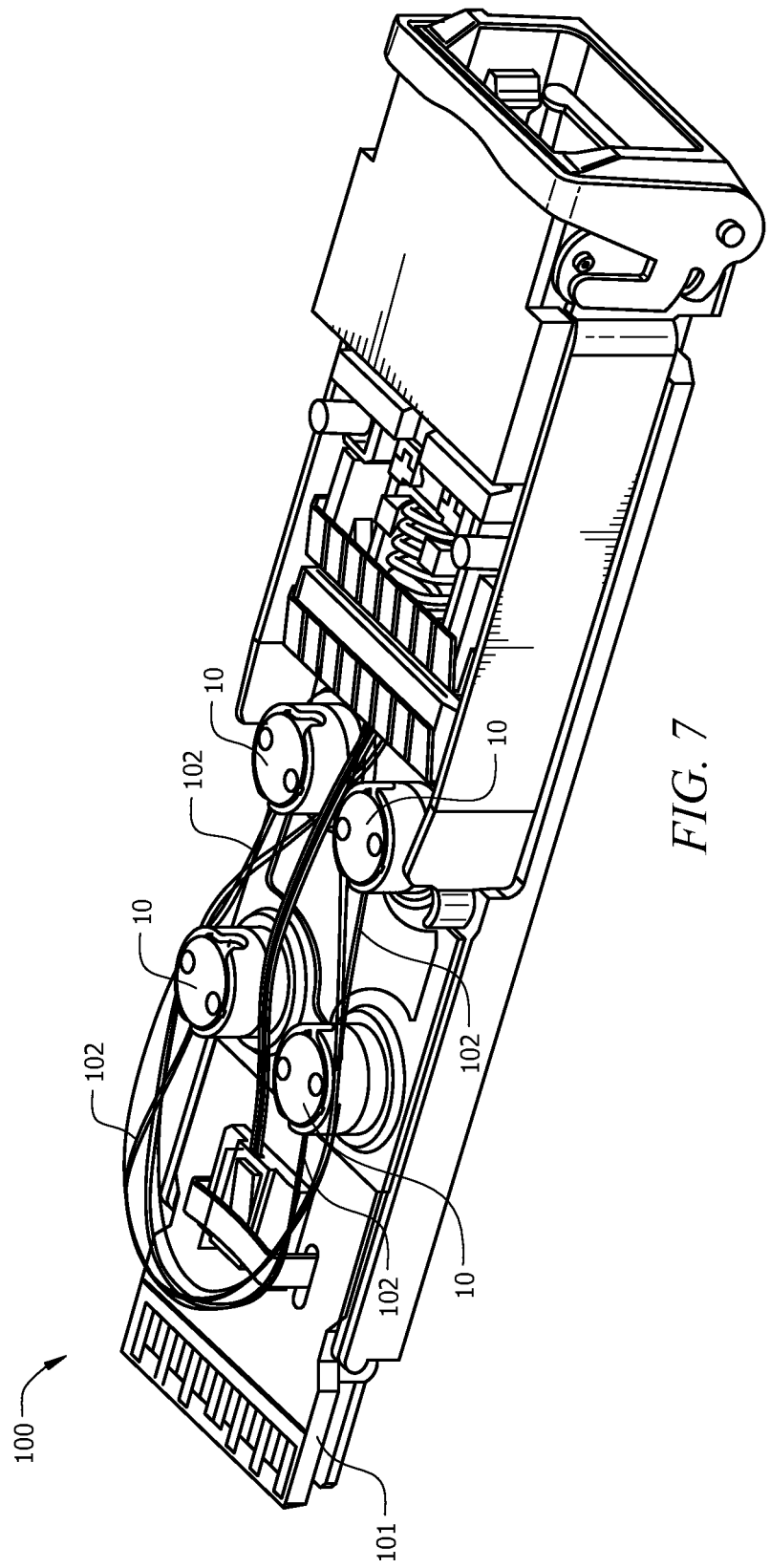
FIG. 7 illustrates a top perspective view of a quad small form factor pluggable (QSFP) module with a portion of its housing removed to allow the inside of the module to be seen, which contains four of the modified TO-can assemblies shown in FIG. 2.

As indicated above, one of the benefits of the modified TO-can assembly of the invention is that it has a more compact profile than known TO-can assemblies that makes it more versatile with respect to spatial constraints and therefore suitable for use in a wider range of applications than known TO-can assemblies. FIG. 7 illustrates a top perspective view of a quad small form factor pluggable (QSFP) module 100 with a portion of its housing removed to allow the inside of the module 100 to be seen. The QSFP module 100 is an example of a module that has spatial constraints that make TO-can assemblies of the type shown in FIG. 1 unsuitable for use in it.

Four of the modified TO-can assemblies 10 shown in FIGS. 2 and 3 are directly mounted on the PCB 101 of the module 100. Each of the assemblies 10 is connected to an optical fiber 102. Because of the relatively short length, L, of the assemblies 10, and because the fibers 102 enter the respective assemblies 10 from their sides, the assemblies 10 are capable of being used in the module 100 despite the spatial constraints.

The solder balls 28 of the assemblies 10 are connected to respective electrical contacts (not shown for clarity) of the PCB 101 to provide electrical connections between the assemblies 10 and the PCB 101. By using the solder balls 28 to make these connections rather than using long leads that are used in known TO-can assemblies, the connections have a more constant impedance that enable the assemblies 10 to achieve relatively high data rates (e.g., in excess of 10 Gigabits per second (Gbps)). For all of the reasons, the modified TO-can assembly of the invention is well suited for use in various types of SFP modules and other types of modules. The modified TO-can assembly, however, is not limited to being used in any particular type of optical communications module.

It should be noted that the invention has been described with reference to illustrative embodiments for the purposes of demonstrating the principles and concepts of the invention. Many modifications may be made to the illustrative embodiments described herein without deviating from the scope of the invention. The components of the modified TO-can assembly of the invention may be modified while yet allowing the modified TO-can assembly to achieve the goals of the invention. For example, the ring 14 could be eliminated and the lower surface 15b of the cap 15 could be directly bonded to the upper surface 13a of the header 13. In fact, the ring 14 may be viewed as being an integral part of the header 13 or of the cap 15, rather than as a separate component. Persons skilled in the art will understand, in view of the description provided herein, that all such modifications are within the scope of the invention.

What is claimed is:

1. A modified transistor-outline (TO)-can assembly comprising:
    a bottom portion comprising an upper surface, a lower surface, an inner surface, and an outer surface, the inner and outer surfaces of the bottom portion defining a side wall of the bottom portion;
    a window having at least an upper surface and a lower surface, the upper surface of the window being mechanically coupled to an inside of the upper surface of the bottom portion about a peripheral portion of the window;
    an optical subassembly (OSA) affixed to an inside of the lower surface of the bottom portion, the OSA including at least an optoelectronic device; and
    a receptacle mechanically coupled to an outside of the upper surface of the bottom portion, the receptacle having at least an upper surface, a lower surface, and an outer wall defining a side wall of the receptacle, the receptacle including an opening formed in the side wall for receiving an optical fiber, and a first reflector formed on an inside of the upper surface of the receptacle and positioned to reflect light received by or transmitted from the OSA.

2. The modified TO-can assembly of claim 1, wherein the first reflector is positioned to receive light from an end of the optical fiber and reflect the light at an angle, $\alpha$, through the window to the OSA.

3. The modified TO-can assembly of claim 1, wherein the first reflector is positioned to receive light from the OSA through the window, and reflect the light at an angle, $\alpha$, to the end of the optical fiber.

4. The modified TO-can assembly of claim 1, wherein the OSA further comprises a substrate affixed to the inside of the lower surface of the bottom portion.

5. The modified TO-can assembly of claim 4, further comprising a second reflector affixed to the substrate in optical alignment with the OSA, the second reflector positioned to reflect light to or from the first reflector.

6. The modified TO-can assembly of claim 1, wherein the receptacle has a groove formed in the inside of the upper surface for receiving the optical fiber and holding the end of the optical fiber in optical alignment with the first reflector.

7. The modified TO-can assembly of claim 6, wherein a recess is formed in the inside of the upper surface of the receptacle adjacent an end of the groove, and wherein the first reflector is disposed in the recess opposite the end of the groove.

8. The modified TO-can assembly of claim 1, further comprising:
    a collar having at least an upper surface, a lower surface, an inner surface, and an outer surface, the inner and outer surfaces of the collar defining a side wall of the collar, wherein a portion of the lower surface of the collar is mechanically coupled to a portion of the upper surface of the bottom portion, and
    wherein a portion of the outer wall of the receptacle is mechanically coupled to a portion of the inner surface of the collar such that the receptacle may be positioned in a direction perpendicular to the upper surface of the bottom portion.

9. The modified TO-can assembly of claim 8, wherein the receptacle is positioned such that a focal point of the first reflector is directed to the end of the optical fiber.

10. The modified TO-can assembly of claim 8, wherein the portion of the lower surface of the collar is mechanically coupled the portion of the upper surface of the bottom portion such that the collar may be positioned in a direction parallel to the upper surface of the bottom portion.

11. The modified TO-can assembly of claim 10, wherein the collar is positioned such that the first reflector is optically aligned with the OSA.

12. A modified transistor-outline (TO)-can assembly comprising:
- a bottom portion comprising an upper surface, a lower surface, an inner surface, and an outer surface, the inner and outer surfaces of the bottom portion defining a side wall of the bottom portion;
- a window having at least an upper surface and a lower surface, the upper surface of the window being mechanically coupled to an inside of the upper surface about a peripheral portion of the window;
- an optical subassembly (OSA) affixed to an inside of the lower surface of the bottom portion, the OSA including at least an optoelectronic device; and
- a receptacle mechanically coupled to an outside of the upper surface of the bottom portion the receptacle portion having at least an upper surface, a lower surface, and an outer wall defining a side wall of the receptacle, the receptacle including an opening formed in the side wall for receiving an optical fiber at a non-zero angle, α, with respect to the upper surface of the bottom portion, and a reflector disposed on an inside of the upper surface of the receptacle and positioned to reflect light received by or transmitted from an end of the optical fiber.

13. The modified TO-can assembly of claim 12, wherein a ranges from approximately −20° to approximately 20° relative to the upper surface of the bottom portion.

14. The modified TO-can assembly of claim 13, wherein a is approximately parallel to the upper surface of the bottom portion.

15. The modified TO-can assembly of claim 12, wherein the reflector folds an optical pathway within the modified TO-can assembly by the angle α.

16. The modified TO-can assembly of claim 12, wherein a groove is formed in the inside of the upper surface of the receptacle for receiving the optical fiber and holding the end of the optical fiber in optical alignment with the reflector.

17. The modified TO-can assembly of claim 16, wherein a recess is formed in the inside of the upper surface of the receptacle adjacent an end of the groove, and wherein the reflector is disposed in the recess opposite the end of the groove.

18. The modified TO-can assembly of claim 12, further comprising:
- a substrate affixed to the inside of the lower surface of the bottom portion, wherein the OSA is affixed to the substrate; and
- a second reflector affixed to the substrate in optical alignment with the OSA, the second reflector positioned to reflect light to or from the first reflector.

19. The modified TO-can assembly of claim 12, wherein the optoelectronic device is a laser diode.

20. The modified TO-can assembly of claim 12, wherein the optoelectronic device is a photodiode.

* * * * *